United States Patent [19]
Ziegler et al.

[11] Patent Number: 5,528,766
[45] Date of Patent: Jun. 18, 1996

[54] MULTIPLE ARBITRATION SCHEME

[75] Inventors: Michael L. Ziegler, Whitinsville, Mass.; John F. Shelton, La Selea Beach; William R. Bryg, Saratoga, both of Calif.

[73] Assignee: Hewlett-Packard Company, Palo Alto, Calif.

[21] Appl. No.: 217,500

[22] Filed: Mar. 24, 1994

[51] Int. Cl.⁶ ................................................. G06F 13/14
[52] U.S. Cl. ................................... 395/293; 395/729
[58] Field of Search ................................ 395/325, 275, 395/189

[56] References Cited

U.S. PATENT DOCUMENTS

| | | | |
|---|---|---|---|
| 4,787,032 | 11/1988 | Culley | 364/200 |
| 4,937,781 | 6/1990 | Lee et al. | 364/900 |
| 5,001,652 | 3/1991 | Thompson | 364/521 |
| 5,280,591 | 1/1994 | Garcia et al. | 395/325 |
| 5,301,282 | 4/1994 | Amini et al. | 395/325 |
| 5,313,641 | 5/1994 | Simcoe et al. | 395/730 |
| 5,345,562 | 9/1994 | Chen | 395/275 |
| 5,375,089 | 12/1994 | Lo | 365/189.04 |
| 5,420,985 | 5/1995 | Cantrell et al. | 395/325 |

FOREIGN PATENT DOCUMENTS

| | | | |
|---|---|---|---|
| 0488771A2 | 11/1991 | European Pat. Off. | G06F 13/364 |
| 0524682A1 | 7/1992 | European Pat. Off. | G06F 13/364 |

*Primary Examiner*—Jack B. Harvey
*Assistant Examiner*—David A. Wiley

[57] ABSTRACT

A multiple round-robin arbitration scheme for a shared bus system that ensures forward progress by each component utilizing the shared bus. In the shared bus system, component modules arbitrate for control of the bus for one or more cycles, and send transactions on the bus during cycles in which they control the bus. The transactions are divided into a set of transaction classes. Certain classes of transactions cannot be issued during certain bus cycles. In certain other cycles, transactions of any class may be issued. The multiple round-robin arbitration scheme ensures forward progress by ensuring that each module seeking to issue a transaction of a given class obtains control of the bus during a cycle when transactions of that class can be issued.

3 Claims, 1 Drawing Sheet

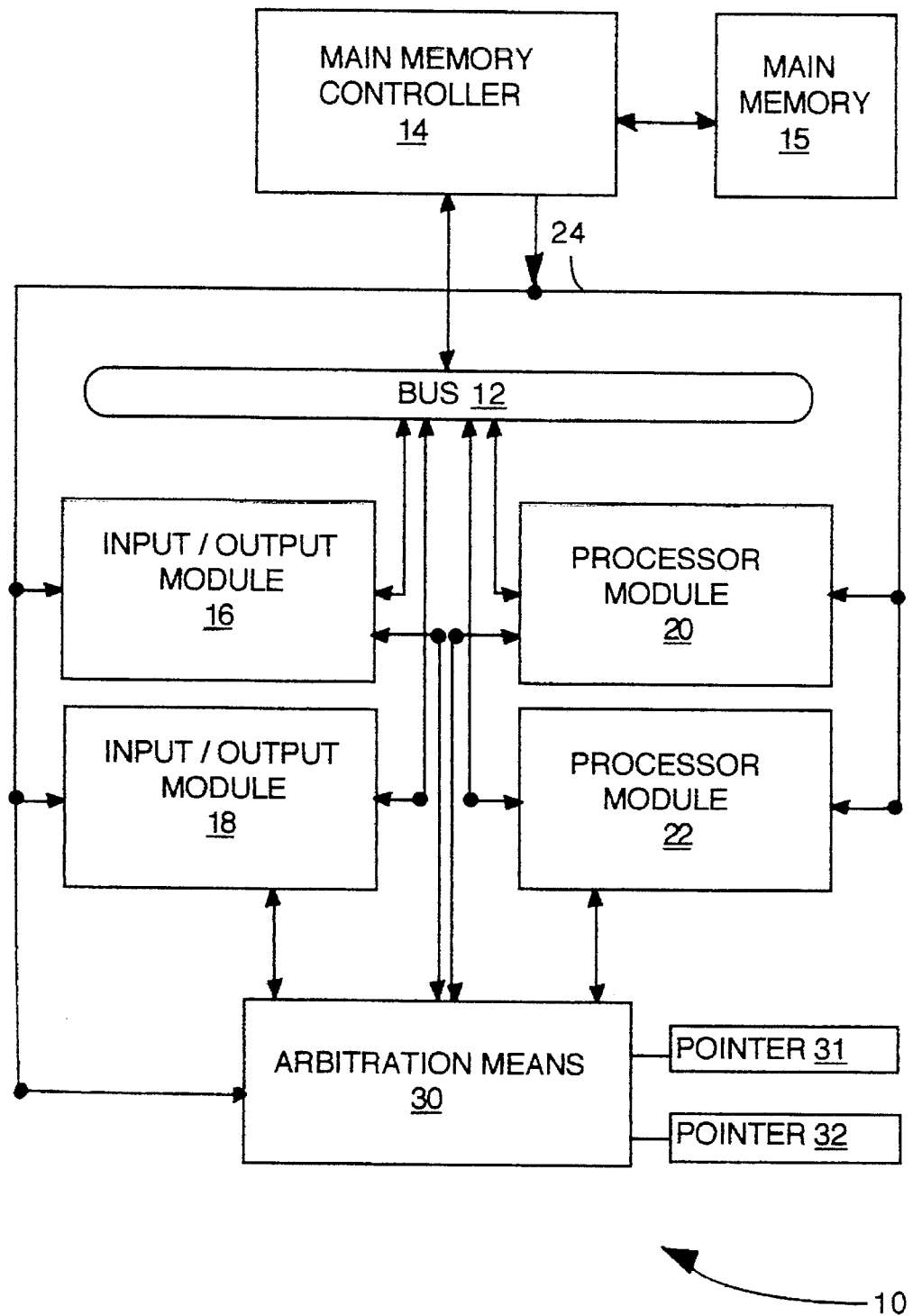
FIG._1

MULTIPLE ARBITRATION SCHEME

FIELD OF THE INVENTION

The present invention relates to computer systems having a plurality of component modules, and more particularly to arbitration protocols for use by the modules in determining which of the modules will use a particular system resource.

BACKGROUND OF THE INVENTION

Computer systems commonly have a plurality of components, such as processors, memory, and input/output devices, and a shared bus for transferring information among two or more of the components. The components commonly are coupled to the bus in the form of component modules, each of which may contain one or more processors, memory, and/or input/output devices. Information is transmitted on the bus among component modules during bus "cycles," each bus cycle being a period of time during which a module has control of the bus and is permitted to transfer, or drive, a limited quantity of information on the bus. Modules communicate by sending each other "transactions" on the bus that take one or more cycles to complete, such as conventional "read" and "write" transactions.

Typically, only one module can send, or drive, information on a shared bus in a given cycle. Thus, any shared bus system must have a bus "arbitration" scheme for determining which module is entitled to drive information on the bus in a particular cycle. Many conventional bus arbitration schemes are available. In most arbitration schemes, each module in a shared bus system generates a signal when it wants to drive the bus, and an arbitration algorithm implemented on one or more processors determines which module is entitled to drive the bus during a given cycle.

Conventional arbitration schemes are generally designed to allow each module seeking to use the bus an opportunity to do so, so that each module is able to make forward progress on the transactions it needs to issue. For example, in a conventional round-robin arbitration scheme, the modules are effectively queued for arbitration priority purposes. The module at the head of the queue wins the bus during the next available bus cycle and is then placed at the end of the queue. Generally, this queuing of modules is implemented by defining an order for the modules and using a pointer that points to the module considered to be at the head of the queue. The module at the head of the queue will win arbitration for the next available cycle. After the module at the head of the queue wins arbitration, the pointer advances to next module according to the defined order. After each module has had an opportunity to control the bus, the pointer returns to the first module in the order. In this manner, each module is assured an opportunity to control the bus on a somewhat regular basis, allowing the module to make forward progress with respect to the transactions it needs to issue. Many conventional arbitration schemes are available that are more complex than a round-robin scheme. It is generally desirable, however, for any arbitration scheme to assure that each module seeking to use the bus has the opportunity to do so and is therefore able to make forward progress.

If a module were always able to issue a transaction when it wins the arbitration, forward progress would be assured for all modules. In some bus systems, however, modules may be prevented from effectively issuing certain types of transactions during certain cycles. For example, input/output transactions may be prohibited during certain cycles, or may be aborted after being issued when input/output modules are too busy to accept any new transactions. Similarly, if the memory controller for a computer system is too busy to accept any new transactions for processing, all new memory-related transactions may be prohibited or aborted until the memory controller can again accept new transactions. Transactions that are aborted, or prevented from being issued, are retained by the relevant module until the transactions can be effectively issued.

In bus systems where classes of transactions cannot be effectively issued during certain cycles, it is possible for a module to be delayed or prevented from making forward progress for undesirably long periods of time. For example, a module may arbitrate for control of the bus to write data to an input/output device, but obtain control of the bus during a cycle when input/output transactions cannot be effectively issued. The module ordinarily will then relinquish control of the bus and be given a lower priority with respect to other modules for a period of time (e.g., the module may be placed at the end of the queue in a round robin arbitration protocol). The module must then wait until it again wins arbitration before it can issue the transaction and make forward progress. While the module is at a lower priority, the transaction it seeks to issue may be temporarily permitted. However, by the time the module again wins control of the bus, the transaction it seeks to issue may again be prohibited. This may occur each time the module wins the bus for an undesirably long period of time. Thus, the module may be unable to make forward progress for undesirably long periods of time.

Accordingly, there is a need for an arbitration scheme that permits each module to make forward progress even though certain classes of transactions cannot be issued on the bus during one or more bus cycles.

SUMMARY OF THE INVENTION

An object of the present invention is, therefore, to provide an improved arbitration scheme.

Another object of the present invention is to provide an arbitration scheme that enables each module arbitrating for use of a shared resource to control that resource when the resource can be used in the desired manner.

Yet another object of the present invention is to provide a bus arbitration scheme that permits each module seeking to use the bus to make forward progress, even though certain classes of transactions are effectively prohibited during one or more bus cycles.

These and other objects of the present invention will become apparent to those skilled in the art from the following detailed description of the invention and preferred embodiments, the accompanying drawings, and the appended claims.

Broadly stated, the present invention is an arbitration scheme that ensures that each component utilizing a shared resource can make forward progress. The present invention will be described in terms of a bus system for connecting a number of modules together. However, it will be apparent to those skilled in the art that the arbitration scheme may be applied to other shared resources.

A shared bus system according to the present invention includes a bus, a set of component modules coupled to the bus, and an arbitration processor for determining which module is entitled to issue transactions on the bus during each cycle. Only one module is entitled to issue transactions on the bus at any given time, and modules control the bus for a minimum period of time defining a bus cycle.

The transactions are divided into two or more classes. At least one class of transactions cannot be effectively issued during one or more bus cycles.

The arbitration processor ensures that each module seeking to issue a transaction is entitled to control the bus for one or more cycles. The arbitration processor further ensures that each module seeking to issue transactions of a given class obtains control of the bus during a bus cycle when transactions of that class can be effectively issued.

BRIEF DESCRIPTION OF THE DRAWINGS

FIG. 1 is a block diagram illustrating one embodiment of a bus system utilizing a multiple arbitration scheme according to the present invention.

DETAILED DESCRIPTION OF THE INVENTION AND PREFERRED EMBODIMENTS

The present invention encompasses an arbitration scheme that ensures that each component utilizing a shared resource, such as a shared computer bus, can make forward progress. In a shared bus system according to the present invention, component modules arbitrate for control of the bus for one or more cycles, and send transactions on the bus during cycles in which they control the bus. The transactions are divided into a set of transaction classes. During certain bus cycles (i.e., restricted cycles), certain classes of transactions cannot be issued. In certain other cycles (i.e., unrestricted cycles), however, any transactions of any class may be issued. Cycles allowing any transactions to issue periodically occur.

The present invention ensures forward progress for each module by ensuring that each module seeking to issue a transaction of a given class obtains control of the bus during a cycle when transactions of that class can be issued. This is accomplished using a multiple round-robin arbitration scheme.

According to the preferred embodiment of a multiple round-robin arbitration scheme according to the present invention, two round-robin pointers are used to implement two round-robin arbitration protocols for separately determining which module wins arbitration during restricted and unrestricted cycles. First, a primary pointer is used to implement a primary round-robin arbitration protocol. The primary pointer keeps track of each module's priority during restricted cycles. A secondary, or "any transaction," round-robin pointer keeps track of each module's priority with respect to unrestricted cycles in which transactions of any class can be issued. During a restricted cycle, the primary pointer determines which module wins arbitration, and advances to the next module according to a predetermined order. During unrestricted cycles, the secondary pointer determines which module wins arbitration and advances to the next module according to a second predetermined order.

The secondary pointer ensures that a module seeking to issue a transaction prohibited during certain cycles will eventually be given an opportunity to issue the transaction. As noted above, cycles that permit any class of transactions will periodically occur. Thus, the secondary pointer will periodically point to each module during a cycle when any class of transaction is allowed, thereby allowing each module the opportunity to issue a transaction of any class. A module seeking to issue a transaction that is prohibited during certain cycles may win arbitration during such a cycle based on the primary pointer and the primary pointer will move on, causing the module to "lose its turn." The secondary pointer, however, eventually will point to the module, allowing it to win during an unrestricted cycle and ensuring that the transaction will eventually issue.

A block diagram of an exemplary computer system according to the present invention is shown at 10 in FIG. 1. Computer system 10 is a multiprocessor computer having a bus 12 and a plurality of components coupled to bus 12. The components include a main memory controller 14, input/output modules 16 and 18, and processor modules 20 and 22. The components communicate with one another by sending and receiving transactions on bus 12.

Processor modules 20 and 22 are the main processors for computer system 10, and software for the system executes simultaneously on all processors. Processor modules 20 and 22 may each include a conventional cache memory for storing recently used data.

Input/output modules 16 and 18 serve as interfaces between computer system 10 and input/output devices. Input/output modules 16 and 18 each contain at least one input/output adaptor that is coupled between bus 12 and an input/output device, generally through an input/output bus.

Processor modules and input/output modules that need to utilize bus 12 arbitrate for control of bus 12 during any given cycle. An arbitration means 30 implements a bus arbitration scheme to determine which module wins arbitration and controls the bus during any given cycle. The bus arbitration scheme implemented by arbitration module 30 is described in more detail below. As explained more fully below, the bus arbitration scheme is a multiple round-robin arbitration scheme that ensures forward progress by all modules.

Main memory controller 14 is responsible for reading information from the main memory 15 and storing information in main memory 15 in a conventional manner. Main memory controller 14 preferably also serves as the "host" module or "bus controller" for purposes of dictating the manner in which bus 12 may be used by the remaining modules, which can be considered client modules. Specifically, main memory controller 14 controls a CLIENT_OP line 24, which is coupled directly to each client module. Main memory controller 14 sends signals to each client module on CLIENT_OP line 24 to indicate what classes of transactions may be issued on bus 12 during the next available cycle.

In the preferred embodiment, the CLIENT_OP bus supports the client option signals shown in Table 1, below, which identify the classes of transactions that are permitted a given cycle.

TABLE 1

| Name | Value | Significance for Relevant Cycle |
| --- | --- | --- |
| NONE_ALLOWED | 010 | No transaction allowed |
| RET_ONLY | 100 | Only return or response transaction allowed |
| NO_IO | 101 | Any except I/O transaction allowed |
| ANY_TRANS | 111 | Any transaction allowed |

The NONE_ALLOWED client option signal is used to indicate that no transactions are allowed during the relevant cycle.

The RET_ONLY client option signal indicates that only returns (write-backs) of previously held private-dirty cache lines, or responses to previous transactions are allowed, during the relevant cycle. For example, if processor module 20 issues a read of a data that is held private-dirty in processor 22's cache, processor 22 may seek to supply that cache line in a conventional cache-to-cache copy transaction. That cache-to-cache copy transaction can be issued during a cycle governed by a RET_ONLY client option signal, since the cache-to-cache copy is a response to the read. Similarly, input/output module 16 can return data from an earlier conventional input/output read transaction during a cycle governed by a RET_ONLY client option signal, since the data return is a response to the I/O read transaction. The RET_ONLY client option signal is useful, for example, if a processor module cannot accept any new coherent transactions because it is occupied performing other tasks, or the memory controller (or memory) cannot accept any read transactions.

The NO_IO client option signal indicates that all transactions except input/output transactions are allowed. The host may issue a NO_IO client option signal, for example, if the input/output modules are incapable of responding to any new transactions because they are too busy.

The ANY_TRANS client option signal indicates that any transaction is allowed during the next available cycle. To ensure that all classes of transactions are periodically allowed, main memory controller periodically issues the ANY_TRANS client option signal for one or more cycles.

As noted above, arbitration module 30 implements a multiple round-robin arbitration scheme for determining which module is entitled to control bus 12 during each cycle. The multiple round-robin arbitration scheme ensures that each module can make forward progress, despite the fact that client option signals limit the classes of transactions allowed on bus 12 during certain bus cycles.

The multiple round-robin arbitration scheme used to determine which module is entitled to control bus 12 may be either a centralized arbitration scheme or a distributed arbitration scheme. If a centralized arbitration scheme is used, each module seeking to use the bus sends an arbitration signal to a central arbiter circuit. The central arbiter circuit processes the arbitration signals to determine the module entitled to use the bus during the next available cycle (i.e., the next bus owner). The central arbiter circuit then sends arbitration response signals back to the modules informing each module whether it is entitled to use the bus. The module that has "won" the arbitration then drives information on the bus. If a distributed arbitration scheme is used, each module sends its arbitration signals to each other module in the system. Each module contains a logical circuit for executing an arbitration algorithm to determine the next bus owner based on these arbitration signals. Upon receiving the arbitration signals, each module determines the next bus owner. The module that has won the arbitration then drives its information on the bus.

The multiple round-robin arbitration scheme ensures forward progress for all modules by ensuring that each module seeking to issue a transaction obtains control of the bus during a cycle when that transaction can be issued. The multiple round-robin arbitration scheme utilizes at least two pointers, a primary pointer 31 and an ANY_TRANS pointer 32 (also referred to herein as a secondary pointer). As explained further below, each pointer keeps track of the module at the head of a separate round-robin "queue." Accordingly, each module has two arbitration priorities, a primary priority and an ANY_TRANS priority.

The primary pointer is used to implement a round-robin protocol to determine which module wins arbitration when the client option signal is something other than ANY_TRANS and a module is entitled to control the bus. The primary pointer points to the module having the highest priority with respect to cycles not governed by ANY_TRANS, and determines which module wins arbitration during these cycles. When the current high priority module wins, the primary pointer advances to the next module according to a predetermined order. The primary pointer does not advance if a module wins the bus during a cycle governed by the ANY_TRANS client option signal.

The ANY_TRANS pointer is used to implement a round-robin arbitration protocol to determine which module wins arbitration when the client option signal is ANY_TRANS and a module is entitled to control the bus. The ANY_TRANS pointer points to the module that has the highest current arbitration priority with respect to the ANY_TRANS client option signal. When the highest priority module wins arbitration during an ANY_TRANS cycle, the ANY_TRANS pointer advances to the next module according to a predetermined order. The ANY-TRANS pointer does not advance if a module wins arbitration during a cycle governed by a client option signal other than ANY_TRANS.

In this manner, a module seeking to issue a transaction that is sometimes prohibited will eventually be given an opportunity to issue the transaction. For example, a module may need to issue an input/output transaction. When this module wins arbitration during a cycle governed by a NO_IO client option signal, the module will be unable to issue the input/output transaction and the cycle will be wasted. The primary pointer will nevertheless advance to the next module, allowing the next module a chance to win arbitration. The ANY_TRANS pointer, however, will not advance. The module seeking to issue the input/output transaction will continue to arbitrate because it was unable to issue its input/output transaction. Since an ANY_TRANS client option signal periodically occurs, the ANY_TRANS pointer will eventually advance to the module seeking to issue the input/output transaction, and the module will issue this transaction. Thus, forward progress is guaranteed by the ANY_TRANS pointer in the context of the above-described arbitration scheme.

It will be appreciated by those skilled in the art based on the present disclosure that a separate round-robin pointer may be used for each client option signal in accordance with the present invention. Additional pointers are not necessary, however, since forward progress is assured by the ANY_TRANS pointer.

It will also be appreciated that it is not necessary to have an ANY_TRANS (i.e., unrestricted) client option signal, so long as each type of transaction is permitted under at least one type of client option signal. In other words, for each transaction type, there must be at least one "permissive" client option signal. A client option signal is permissive with respect to a transaction type if it allows that transaction type to issue. Forward progress is ensured by periodically issuing permissive client option signals that allow for each transaction type. In the preferred embodiment, an ANY_TRANS signal is used which is permissive with respect to all transaction types.

It will also be appreciated that an arbitration scheme according to the present invention may have a primary pointer that advances during each and every cycle. This is possible because the ANY_TRANS pointer nevertheless ensures forward progress.

It will be appreciated by those skilled in the art that it is not necessary to have both input/output and processor modules. An arbitration scheme according to the present invention may be implemented with any type of modules, such as two or more processor modules.

It will further be appreciated that the arbitration protocols used for the ANY_TRANS cycles and/or the other cycles need not be round-robin protocols. Any protocol that allows forward progress during the relevant cycles may be used.

It will be appreciated by those skilled in the art that memory controller 14 serves as the host, or bus controller, for convenience only, and that host functions and memory control functions may be separated into two or more modules.

The client option signals shown in Table 1 have been chosen, for illustrative purposes, to show one possible way that the CLIENT_OP bus may limit the transactions allowed during a given cycle. It will be appreciated that other types of client option signals may be used to limit the types of transactions that can be issued on the bus.

The terms "bus(es)" and "line(s)" have both been used in this detailed description to denote various sets of one or more electrical paths that are more fully described above. It will be appreciated by those skilled in the art that the terms "bus" and "line" are not intended to be mutually exclusive or otherwise limiting in themselves. For example, the terms "CLIENT_OP bus" and "CLIENT_OP lines" have been used interchangeably to denote a set of hardware lines driven only by the host, as described more fully above.

It will be appreciated by those skilled in the art that a multiple arbitration scheme according to the present invention may be used to determine control of any shared resource. In the preferred embodiment, the shared resource is a computer bus, but the present invention is not limited to arbitration for control of a computer bus.

Various modifications to the present invention will become apparent to those skilled in the art from the foregoing description and accompanying drawings. Accordingly, the present invention is to be limited solely by the scope of the following claims.

What is claimed is:

1. A data processing system having a shared resource utilized by a plurality of component modules, said data processing system comprising:

a plurality of component modules, only one of said modules being emitted to utilize the shared resource at any given time, wherein a module that is entitled to utilize the shared resource at a given time has control of the shared resource for a minimum period of time defining a cycle, and wherein said modules utilize the shared resource to perform a plurality of classes of operations, at least one of said classes of operations being a restricted class that cannot be effectively performed during one or more restricted cycles, said restricted operations being permissible during one or more permissive cycles; and arbitration means for determining which module is emitted to control the shared resource during each cycle, said arbitration means ensuring that each module seeking to perform an operation utilizing the shared resource is entitled to control the shared resource for one or more cycles, said arbitration means further comprising first and second arbitrators, said first arbitrator being active during said restricted cycles to determine which module requesting control of said shared resource is granted control of said shared resource during said restricted cycles and said second arbitrator being active during said permissive cycles to determine which module requesting control of said shared resource is granted control of said shared resource during said permissive cycles, wherein said modules request control of said shared resource from both of said first and second arbitrators when said modules require control of said shared resource.

2. The data processing system of claim 1, wherein the shared resource is a bus and an operation is a transaction on the bus.

3. The data processing system of claim 1, wherein the arbitration means includes a first pointer for implementing a round-robin protocol determining which module is entitled to control the shared resource during said restricted cycles, and a second pointer for determining which module is entitled to control the shared resource during said permissive cycles.

* * * * *

UNITED STATES PATENT AND TRADEMARK OFFICE
CERTIFICATE OF CORRECTION

PATENT NO. : 5,528,766
DATED : June 18, 1996
INVENTOR(S) : Michael L. Ziegler et al.

It is certified that error appears in the above-identified patent and that said Letters Patent is hereby corrected as shown below:

Column 8,
Line 2, delete "emitted" and insert therefor -- entitled --
Line 14, delete "emit-" and insert therefor -- entitled --
Line 15, delete "ted"

Signed and Sealed this

Eighteenth Day of May, 2004

JON W. DUDAS
*Acting Director of the United States Patent and Trademark Office*